United States Patent Office 3,296,088
Patented Jan. 3, 1967

3,296,088
PROCESS FOR THE PRODUCTION OF URIDYLIC ACID BY FERMENTATION
Shukuo Kinoshita, Tokyo, Kiyoshi Nakayama, Sagamihara-shi, Zenroku Sato, Machida-shi, and Haruo Tanaka, Tokyo, Japan, assignors to Kyowa Hakko Kogyo Co., Ltd., Tokyo, Japan, a corporation of Japan
No Drawing. Filed Nov. 25, 1964, Ser. No. 413,976
Claims priority, application Japan, Nov. 27, 1963, 38/63,230
14 Claims. (Cl. 195—28)

This invention relates to a process for the production of 5'-uridylic acid, i.e. uridine-5'-monophosphate, by fermentation, and the object of the invention is to produce 5'-uridylic acid economically and upon an industrial scale by a fermentation process which employs a microorganism which is a bacterium belonging to *Brevibacterium ammoniagenes*.

5'-uridylic acid produced in this invention is an important compound as a component of nucleic acids and has the following formula:

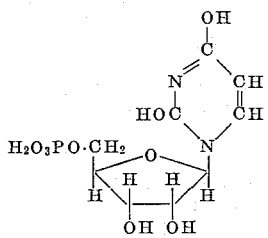

It is useful as an additive to foodstuffs to improve their flavor.

Various investigations have been made into the methods for producing nucleotides utilizing microorganisms. As a result of these investigations it has been found that when a microorganism which is a bacterium belonging to *Brevibacterium ammoniagenes* is cultivated in a medium containing uracil in addition to the normal constituents thereof remarkable quantities of ribosyl phosphates of the uracil contained in the medium are formed and accumulate in the medium. This phenomenon was not previously known and this invention is based upon the discovery of this fact.

The especially important features of this invention are that (1) uracil is present in the fermentation medium and (2) a microorganism which is a bacterium belonging to *Brevibacterium ammoniagenes* is employed as the microorganism.

As the medium for use in this invention, any of the media which contain a carbon source such as carbohydrates and the like (for example, glucose, hydrolysis product of starch and molasses), a nitrogen source (for example, urea, ammonium chloride and ammonium nitrate), inorganic substances (for example, potassium phosphates, magnesium sulfate, and calcium chloride) and nitrogen-containing natural products (for example, corn steep liquor, yeast extract, meat extract, peptone and fish meal) in the proper ratio, may be employed. These media are well known in the art. When a specific nutrient-requiring strain of *Brevibacterium ammoniagenes* is used, the medium must, of course, contain the substance which satisfied the growth requirements of this strain.

According to the invention, the uracil present in the medium can be present at the commencement of the fermentation or it can be added to the fermentation medium during the course of the culturing. When it is added during the course of the culturing it can be added at one time or in several portions. In addition the uracil can be that which is formed in the medium during the fermentation due to the properties of the strain of *Brevibacterium ammoniagenes* being used. Additionally the uracil present may be that which is formed in situ in the medium from a derivative of uracil which derivative is added to the medium at the beginning of the fermentation or during the course of the fermentation.

The amount of the uracil employed in the present invention and which is added to the medium will vary over a wide range. It will be somewhat dependent upon the specific strain of bacterium used. In general it will be in the range of from about 0.1 gram about 10 grams per liter of medium. It is preferred that the amount be in the range of from 1 to 5 grams per liter of fermentation medium. In the event a compound which yields uracil under the conditions of the fermentation is employed then the amount of the compound will be selected so that the proper amount of uracil is present in the medium during the fermentation.

The fermentation is performed under aerobic conditions, for example, in a shaking culture or in submerged culture with shaking and aeration. It is performed at a temperature between 20° C. and 40° C. and at a pH between 5.5 and 9.0. Generally, remarkable quantities of 5'-uridylic acid are formed and accumulate in the medium and the cells, after cultivation time of from 2 to 8 days.

5'-uridylic acid can be recovered after completion of the cultivation, by means which are, per se, known in the art, for example, ion-exchange resin treatment, adsorption, precipitation or extraction process.

The following examples are presented to illustrate the invention. These examples are not to be construed as in any way limiting the invention. Percentages are by weight unless otherwise indicated.

Example 1

An inoculant culture is prepared by cultivating *Brevibacterium ammoniagenes* (ATCC 6872) in a medium containing 2% of glucose, 1% of peptone, 1% of yeast extract, 0.3% of NaCl and 30 micrograms per liter of biotin, for 24 hours. The fermentation medium is inoculated with 10% by volume of this inoculant culture. Both media are used after 20-milliliter (ml.) portions of them are put in 250-milliliter Erlenmeyer flasks and sterilized. The fermentation medium has the following composition and the fermentation is carried out in a shaking culture at 30° C.

Composition of the fermentation medium:

| | | |
|---|---|---|
| Glucose | grams | 100 |
| Urea | do | 6 |
| $KH_2PO_4$ | do | 10 |
| $K_2HPO_4$ | do | 10 |
| $MgSO_4 \cdot 7H_2O$ | do | 10 |
| $CaCl_2 \cdot 2H_2O$ | do | 0.1 |
| Biotin | μgrams | 30 |
| Yeast extract | grams | 10 |
| Uracil | do | 2 |

The above quantities are dissolved in water and the solution is made up to one liter. Above-mentioned portions of this solution are put in flasks after adjusting the pH at 8.0 with NaOH and sterilized in an autoclave at a pressure of 1 kilogram per square centimeter (kg./cm.$^2$) for 10 minutes.

When cultivation is performed for 72 hours, 2.60 milligrams per milliliter (mg./ml.) of 5'-uridylic acid is formed and accumulates in the fermentation medium.

5'-uridylic acid in the fermentation medium is recovered by the treatment with ion exchange resin in the following manner:

The filtrate (1.2 liter) obtained by removing the cells from fermentation broth is treated with active carbon and the 5'-uridylic acid absorbed on the carbon is eluted with 50% aqueous ethanol containing 3% ammonia. The ammonia in the eluate is removed by evaporation under vacuum. The solution thus obtained is passed through the resin tower of a polystyrene strongly basic anion exchange resin Dowex 1 x 2 (Cl-type), the resin tower which absorbed 5'-uridylic acid is washed with water, eluted gradiently with 0.01 N HCl, 0.05 N HCl, 0.1 N HCl and 0.5 N HCl, in this order. The eluate fraction containing 5'-uridylic acid is condensed and cooled after the addition of ethanol. The 5'-uridylic acid precipitated is recovered by centrifuge and dried (yield 1.1 g.).

*Example 2*

Cultivation is carried out in the same manner as in Example 1, except that uracil is not added into the fermentation medium at the beginning, and 2 mg./ml. is added to the fermentation medium after 48 hours' cultivation, 2.81 mg./ml. of 5'-uridylic acid is formed and accumulates in the fermentation medium, after additionally cultivating for 24 hours.

*Example 3*

Cultivation is carried out in the same manner as in Example 2, except that *Brevibacterium ammoniagenes* ATCC 6871 is used, 0.53 mg./ml. of 5'-uridylic acid is formed and accumulates in the fermentation medium.

*Example 4*

Cultivation is carried out in the same manner as in Example 2, except that *Brevibacterium ammoniagenes* KY 3464 (ATCC No. 15750) is used, 3.20 mg./ml. of 5'-uridylic acid is formed and accumulates in the fermentation medium.

*Example 5*

Cultivation is carried out in the same manner as in Example 2, except that *Brevibacterium ammoniagenes* KY 3465 (ATCC No. 15751) is used, 3.40 mg./ml. of 5'-uridylic acid is formed and accumulates in the fermentation medium.

In the same manner as in the preceding examples, additional strains of *Brevibacterium ammoniagenes* can be cultured in a fermentation medium containing uracil and 5'-uridylic acid obtained in substantially similar yields.

What is claimed is:

1. A process for the production of 5'-uridylic acid which comprises culturing a bacterium belonging to *Brevibacterium ammoniagenes* in a fermentation medium therefor which in addition to the normal constituents thereof contains uracil, and recovering from said medium the 5'-uridylic acid which accumulates therein.

2. A process for the production of 5'-uridylic acid which comprises culturing a bacterium belonging to *Brevibacterium ammoniagenes* in a fermentation medium therefor which in addition to the normal constituents thereof contains uracil, and recovering from said medium the 5'-uridylic acid which accumulates therein.

3. A process as in claim 2 wherein the uracil is added to the fermentation medium during the culturing of the bacterium.

4. A process for the production of 5'-uridylic acid which comprises culturing a bacterium belonging to *Brevibacterium ammoniagenes* in a fermentation medium therefor which in addition to the normal constituents thereof contains uracil at a concentration of from about 0.1 to about 10 grams per liter of medium, the fermentation being conducted at a temperature of from 20° to 40° C. and at a pH of from 5.5 to 9.0, and recovering from said medium the 5'-uridylic acid which accumulates therein.

5. A process as in claim 4 wherein the fermentation is conducted in a submerged culture with aeration and shaking.

6. A process for the production of 5'-uridylic acid which comprises culturing *Brevibacterium ammoniagenes* (ATCC No. 6872) in a culture medium therefor containing in addition to the normal constituents thereof about 2 grams of uracil per liter of culture medium, the fermentation being carried out at a temperature of about 30° C. and the pH of the fermentation medium being about 8, and recovering from said medium the 5'-uridylic acid which accumulates therein.

7. In the process for the fermentative production of 5'-uridylic acid by culturing a microorganism in a fermentation medium, and recovering accumulated 5'-uridylic acid from said medium, the improvement wherein the microorganism is a bacterium belonging to *Brevibacterium ammoniagenes* and the fermentation medium contains uracil.

8. A process as in claim 7 wherein the microorganism is *Brevibacterium ammoniagenes* (ATCC No. 6872).

9. A process as in claim 6 wherein the microorganism is *Brevibacterium ammoniagenes* (ATCC No. 6871).

10. A process as in claim 6 wherein the microorganism is *Brevibacterium ammoniagenes* KY No. 3464 (ATCC No. 15750).

11. A process as in claim 6 wherein the microorganism is *Brevibacterium ammoniagenes* KY No. 3465 (ATCC No. 15751).

12. A process as in claim 7 wherein the microorganism is *Brevibacterium ammoniagenes* (ATCC No. 6871).

13. A process as in claim 7 wherein the microorganism is *Brevibacterium ammoniagenes* KY No. 3464 (ATCC No. 15750).

14. A process as in claim 7 wherein the microorganism is *Brevibacterium ammoniagenes* KY No. 3465 (ATCC No. 15751).

References Cited by the Examiner

UNITED STATES PATENTS 3,214,344   10/1965   Kinoshita et al. _____ 195—28

OTHER REFERENCES

Crawford et al.: Journal of Biological Chemistry, vol. 226 (1957), pp. 1093 to 1101.

A. LOUIS MONACELL, *Primary Examiner.*

ALVIN E. TANENHOLTZ, *Examiner.*